C. E. LEEN.
AGRICULTURAL IMPLEMENT.
APPLICATION FILED JUNE 6, 1916.
1,267,778.
Patented May 28, 1918.
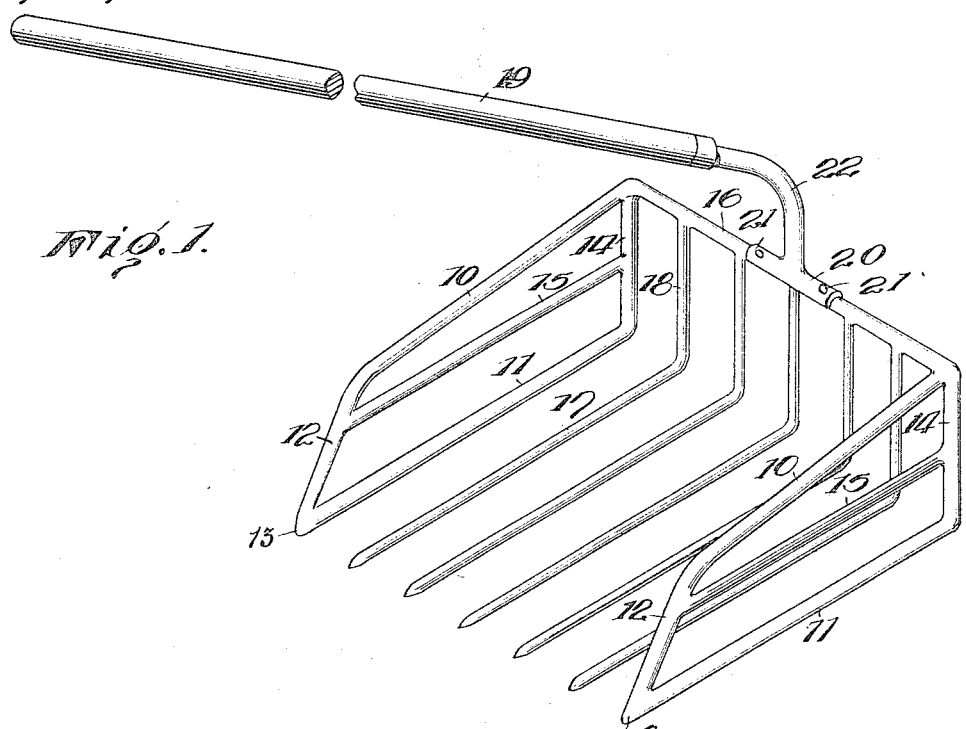
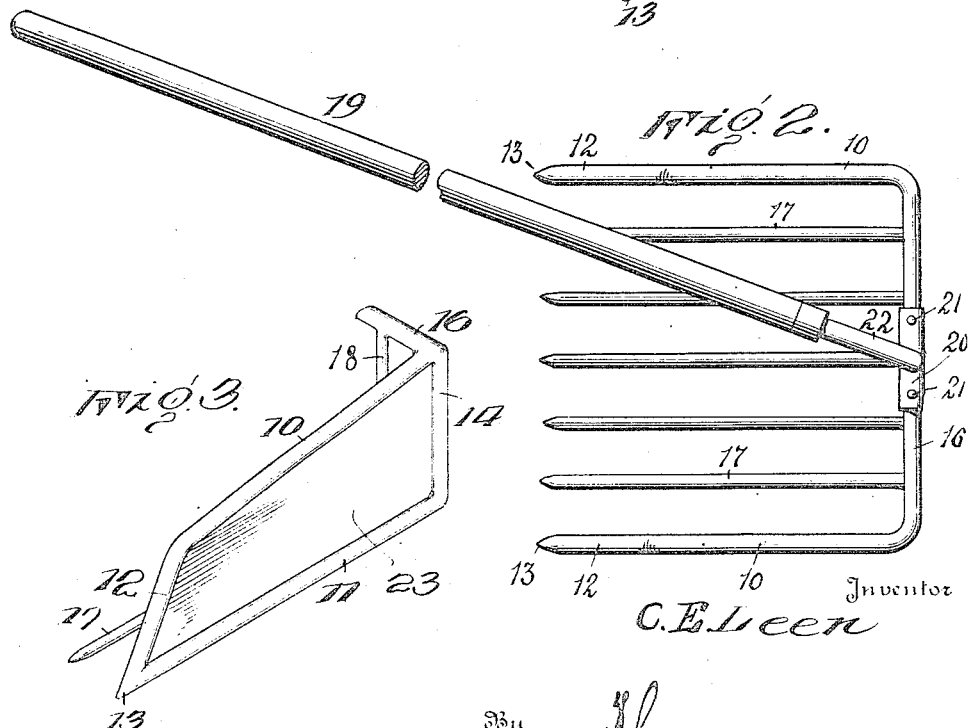

UNITED STATES PATENT OFFICE.

CHARLES E. LEEN, OF MONARDA, MAINE.

AGRICULTURAL IMPLEMENT.

1,267,778.                Specification of Letters Patent.    Patented May 28, 1918.

Application filed June 6, 1916. Serial No. 102,020.

*To all whom it may concern:*

Be it known that I, CHARLES E. LEEN, a citizen of the United States, residing at Monarda, in the county of Aroostook and State of Maine, have invented certain new and useful Improvements in Agricultural Implements, of which the following is a specification.

This invention relates to improvements in devices for gathering potatoes and like products from the ground after they have been dug, and has for one of its objects to provide a simply constructed implement preferably arranged to be manually operated, and whereby the labor and time required to gather the products is materially reduced.

With this and other objects in view, the invention consists in certain novel features of construction, as hereinafter shown and described and then specifically pointed out in the claim; and in the drawing illustrative of the preferred embodiment of the invention—

Figure 1 is a perspective view of the improved implement;

Fig. 2 is a plan view of the same;

Fig. 3 is a perspective detail illustrating a modification in the construction.

Corresponding and like parts are referred to in the following description and indicated in all the views of the drawings by the same reference characters.

The improved device comprises a frame which constitutes a gathering device and includes vertical side members spaced apart and extending in parallel relation with their forward ends inclined rearwardly and upwardly and sharpened or pointed and a rear member connecting the upper rear corners of the sides, and a plurality of tines or teeth with their forward portions extending in parallel relation to the sides and their rear portions upturned and united to the rear transverse member of the frame. The whole device thus far described is preferably formed of rods united at their junctions by welding, brazing, or otherwise securing them together, so that the device is practically in one single piece.

The sides of the improved device each comprises an upper member 10 and a lower member 11, the upper member extending obliquely to the longitudinal axis of the lower member, or inclining downwardly toward the forward end, with the forward end inclined at a greater angle, as shown at 12, and united at 13, to the forward end of the lower member 11. The members 10—11 are each connected at their rear ends by a vertical member 14 and the members 12—14 united by an intermediate longitudinal member 15. The members 10—14 are connected at their meeting points by a rear transverse member 16. At their meeting points the members 10—12 are pointed or sharpened, as shown, to facilitate their passage over the ground. The forward portions 17 of the tines are located between the members 11 and extend in parallel relation to each other and likewise to the members 11. The rear portions 18 of the tines extend vertically and are united to the transverse member 16, the vertical portions being in parallel relation to each other and likewise in parallel relation to the vertical portions 14 of the frame. The spaces between the tines 17—18 are left unobstructed from end to end, as shown in Fig. 1.

An operating handle 19 of any suitable length forms a part of the improved implement and is connected thereto by a bracket or clip device 20 riveted or otherwise secured to the transverse member 16, as shown at 21, and with an upwardly and laterally directed extension or arm 22 to which the handle portion 19 is united. The upper or laterally directed portion 22 of the bracket member extends obliquely to the longitudinal axis of the side portions and tines of the implement, as illustrated in Fig. 2, and the handle 19 likewise extends in the same oblique direction, so that the operator can stand at one side of the line of movement of the implement. The handle 19 is thus permanently fixed to the frame of the implement and extends permanently in longitudinal alinement with the laterally and obliquely directed portion 22 of the bracket member.

The improved implement is designed more particularly for gathering potatoes after they have been dug and deposited upon the surface of the ground in the usual manner, and in operating the improved device the implement is disposed at the beginning of the row of potatoes and the operator stands at one side of the row in advance of the gathering portion of the implement and draws the latter over the ground with the forward portion 17 of the tines closely engaging the ground and passing beneath the potatoes and also preferably slightly beneath the surface of the ground on which the potatoes lie. The earth and smaller potatoes and other matter which it is not designed to gather falls between the tines and is left upon the ground while the larger potatoes only are gathered. To this end it will be necessary to space the tines apart a sufficient distance to gather only the larger potatoes and permit the smaller potatoes and similar products or articles to pass between the tines. When the space within the gathering portion of the implement is full of potatoes, they can be readily deposited in a basket or other suitable receptacle, and the operation repeated, as will be obvious.

If preferred the sides of the gathering portion of the device may be constructed with a solid panel or plate, as shown at 23 in Fig. 3.

The improved implement is simple in construction, can be inexpensively manufactured and of any required capacity.

Having thus described the invention, what is claimed as new is:

A gathering device including spaced vertical side members connected at their rear ends by a transverse cylindrical bar and a bottom member formed of a plurality of rods having their forward ends spaced apart and their rear ends extended upwardly and rigidly secured to the cylindrical bar, an elongated socket member having its lower face concave and fitting over and rigidly secured to the cylindrical bar at the center thereof and its upper face provided with an upwardly and forwardly extending shank disposed obliquely to the sides and bottom, and a handle rigidly secured to the obliquely disposed portion of the shank and having its free end extending forwardly and at one side of the adjacent side member.

In testimony whereof I affix my signature.

CHARLES E. LEEN. [L. S.]